Patented Oct. 8, 1940

2,216,841

UNITED STATES PATENT OFFICE 2,216,841

DUROHYDROQUINONE - MONOPHYTYL-ETHER AND PROCESS FOR THE MANUFACTURE OF SAME

Otto Isler, Basel, Switzerland, assignor to Hoffmann-La Roche Inc., Nutley, N. J., a corporation of New Jersey No Drawing. Application September 26, 1938, Serial No. 231,847. In Switzerland October 1, 1937

5 Claims. (Cl. 260—611)

It is known that compounds possessing a vitamin E action can be obtained from wheat germ oil and cotton seed oil ("The Journal of Biological Chemistry," vol. 113, year 1936, page 319; "Science," vol. 83, year 1936, page 421). These compounds, known as tocopherols, have the approximate empirical formula $C_{29}H_{50}O_2$; they contain a hydroxyl group, and a further oxygen atom which could not be characterised in detail so far. In methyl-alcoholic solution they reduce silver nitrate on heating; they have a hydroquinone-like absorption spectrum with a maximum at 2180 Å. and are almost inactive optically.

It is further known that vitamin E concentrates can be inactivated by mild chlorination or bromination ("The Journal of Biological Chemistry," vol. 107, year 1934, page 471) and that their activity can again be restored by boiling of the halogen compounds in methyl alcohol with zinc dust and hydrochloric acid. Perbenzoic acid destroys the vitamin E action in the cold. By hydrogenation neither the activity nor the unsaturated nature of the molecule could be abolished. These experiments appear to render possible the presence of a sterically hindered aliphatic double bond.

On heating α-tocopherol to 350° C. durohydroquinone is formed as a decomposition product ("Journal of the American Chemical Society," vol. 59, year 1937, page 1154) which fact led to the assumption that α-tocopherol might be a mono-ether of durahydroquinone. If α-tocopherol is subjected to a selenium dehydrogenation at 300–330° C., duroquinone is obtained ("Science," vol. 86, year 1937, page 35). In accordance with the above empirical formula the ether component of tocopherol could be a diterpene alcohol.

It has now been found that a compound with vitamin E action, the durohydroquinone-monophytyl-ether, can be obtained by reacting phytyl halides with durohydroquinone in presence of a substance capable of combining with the hydrogen halide formed in the reaction.

The durohydroquinone - monophytyl - ether, which was hitherto unknown, corresponds in its properties to a great extent with the tocopherols. It forms a light-yellow, slightly viscous oil which, on warming, reduces silver nitrate in methyl-alcoholic solution and, on heating to 350° C., splits off durohydroquinone. From aqueous methyl-alcoholic potash solution it can be shaken out with ether.

The durohydroquinone-monophytyl-ether is to be used as a pharmaceutical preparation.

Example 2.64 parts by weight of phytyl bromide (prepared according to the directions given in "Annalen der Chemie," vol. 475, year 1929, page 193, in respect of tetrahydrofarnesylbromide), 1.50 parts by weight of durohydroquinone and 1.20 parts by weight of potassium carbonate are covered with 10 parts by weight of acetone and heated for 48 hours in an atmosphere of nitrogen under reflux. The acetone is then evaporated in vacuo, the residue taken up in petroleum ether and the petroleum ether solution shaken out several times with 92 per cent methyl alcohol after filtration. The petroleum ether solution purified in this manner is adsorbed on an aluminium oxide column and the chromatogram developed with petroleum ether and benzene. Phytol-like compounds and duroquinone formed by oxidation from durohydroquinone pass through the column. From the upper half of the column the durohydroquinone ethers are eluted with a mixture of 70 per cent of methyl alcohol and 30 per cent of ether. The solvent is then evaporated, the residue taken up in petroleum ether and another chromatogram prepared. By eluting the lower zone the durohydroquinone-monophytyl-ether is obtained as a light-yellow, slightly viscous oil.

I claim:

1. Durohydroquinone-monophytyl-ether.

2. The manufacture of durohydroquinone-monophytyl-ether comprising reacting phytyl bromide with durohydroquinone in presence of potassium carbonate.

3. The manufacture of durohydroquinone-monophytyl-ether comprising reacting phytyl bromide with durohydroquinone in presence of potassium carbonate and of acetone as solvent.

4. A process for the preparation of durohydroquinone-monophytyl ether comprising reacting a phytyl halide with durohydroquinone in the presence of an alkali metal carbonate.

5. A process for the preparation of durohydroquinone-monophytyl ether comprising reacting a phytyl halide with durohydroquinone in the presence of an alkali metal carbonate and an inert solvent.

OTTO ISLER.